3,563,994
Patented Feb. 16, 1971

3,563,994
ORTHO-SUBSTITUTED 2-PHENYL-IMINO-1-AZA-CYCLOALKANES
Hartmund Wollweber and Rudolf Hiltmann, Wuppertal-Elberfeld, and Kurt Stoepel, Wuppertal-Vohwinkel, Germany, assignors to Farbenfabriken Bayer Aktiengesellschaft, Leverkusen, Germany
No Drawing. Filed Apr. 11, 1968, Ser. No. 720,475
Claims priority, application Germany, Apr. 24, 1967, F 52,224
Int. Cl. C07d 29/28
U.S. Cl. 260—293                41 Claims

ABSTRACT OF THE DISCLOSURE

There are provided 2-phenyl-imino-1-aza-cycloalkanes having an o-substituent on the phenyl nucleus comprising alkyl, alkoxy, halogen, trifluoromethyl, alkanoyl and mercaptoalkyl, wherein alkyl, alkoxy and alkanoyl have 1–4 carbon atoms. The compounds are useful for their blood pressure depressant activity and their CNS damping effect. They can be prepared by reacting substituted anilines with selected lactams. A representative compound is 2-(2′,6′-dimethylphenyl)-imino-1-aza-cyclopentane and its HCl acid addition salt.

---

This invention relates to novel o-substituted 2-phenyl-imino-1-aza-cycloalkanes and their production which have new, useful and surprising properties as compared to prior known compounds lacking such o-substitution.

The 2-phenyl-imino-1-aza-alkanes previously synthesized [R. Bonnet, K. S. Chan, J. A. D. Gale, Canad. J. of Chem. 42, p. 1073 (1964); H. and K. Bredereck, B. 94, p. 2278 (1961)] are pharmacodynamically not very remarkable. On the other hand, fungicidal (French Pat. 1,367,799) and insecticidal U.S. Pat. 3,284,465 properties of individual representative compounds have been disclosed.

It has now been found that o-substituted 2-phenyl-imino-1-aza-cycloalkanes of the formula:

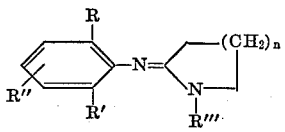

in which:

R is alkyl, alkoxy, halogen, trifluoromethyl alkanoyl or mercaptoalkyl,
R′ is hydrogen, alkyl, alkoxy or halogen,
R″ is hydrogen, alkyl, alkoxy, halogen, trifluoromethyl, alkanoyl or alkoxycarbonyl,
R‴ is hydrogen or alkyl, and
$n$ is 1 or 2, have marked pharmacodynamic activity. The alkyl, alkoxy, alkanoyl etc. radicals have 1–4 carbon atoms.

Surprisingly, according to the invention the introduction of a radical R into the o-position of the phenyl nucleus of 2-phenyl-imino-1-aza-cycloalkanes leads to the formation of compounds which have a strong blood pressure depressant activity. They are therefore valuable for treating various forms of hypertonia, especially of essential hypertension. Moreover, in general the derivatives have a damping effect on the central nervous system, an analgetic effect and an inhibiting effect on the secretion of gastric juice.

The new compounds are administered perorally, rectally, intraperitoneally, intramuscularly, intravenously, subcutaneously, etc. in the same amounts and dosage forms as is usual for blood pressure depressant substances, i.e. 1 to 50 mg./day.

The o-substituted 2-phenyl-imino-aza-cycloalkanes of the invention are prepared by reacting an o-substituted aniline or salt thereof of the formula:

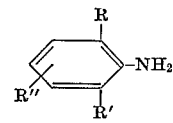

in which R, R′ and R″ have the same meaning as above, with a lactam of the formula:

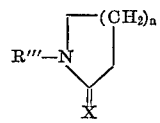

in which R‴ and $n$ have the same meaning as above and X is oxygen, sulphur or NH, or with a salt or reactive derivative thereof, optionally in the presence of a condensation agent.

The reactive lactam derivatives comprise, for example, compounds of the formula:

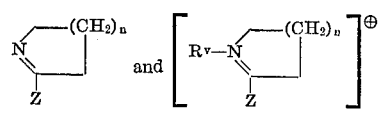

in which $n$ has the same meaning as above, Z is a reactive ester, ether or amino group and R$^v$ is alkyl.

When Z is a reactive ester group, these derivatives are lactim esters. They are obtained by reacting a lactam or thiolactam of the formula:

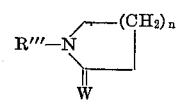

in which R‴ and $n$ have the same meaning as above and W is oxygen or sulphur, with an inorganic acid (such as hydrogen chloride, boron trifluoride, sulphuric acid) or with an inorganic or organic acid chloride (such as phosphorus oxychloride, phosphorus pentachloride, phosgene, thionyl chloride, benzoyl bromide or a mixture of phosgene/aluminum chloride or phosgene/hydrogen chloride or phosgene/phosphorus oxychloride). The lactam esters are then usually present as a complex salt of the formula:

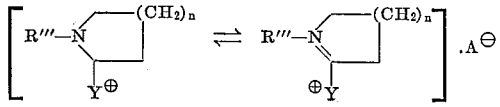

wherein R‴ and $n$ have the same meaning as above and Y and A denote the following groups, for example:

| Y | A |
|---|---|
| O—POCl$_2$, S—POCl$_2$ | Cl |
| Cl | Cl, AlCl$_4$, HCl$_2$, POCl$_4$ |
| OSOCl | Cl |
| O—CO—C$_6$H$_5$, S—CO—C$_6$H$_5$ | Br, Cl |
| O—COCl, S—CO—Cl | Cl |
| C$_6$H$_5$—SO$_2$—O—, Cl, Br | — |

The reactions can be carried out by first forming the reactive lactim ester from the lactams and the acid halide, optionally in the presence of solvents, such as benzene, toluene or tetramethylene-sulphone, then adding the o-substituted aniline dropwise and optionally further heating the reaction mixture for some time.

However, it is also possible to add the acid chloride, for example, phosphorus oxychloride, dropwise to a mixture of lactam and o-substituted aniline, optionally in the presence of solvents, and further heating the reaction mixture for some time. When R''' in the above formula is hydrogen, it is not necessary to use pyrrolidone or piperidone in the condensation with phosphorus oxychloride; it is also possible to start from N-vinylpyrrolidone or N-vinyl-piperidone. The N-vinyl group is split off in the subsequent condensation.

The reactive lactim esters can also be obtained by rearrangement according to Beckmann, for example, of oxime sulphonates of the formula:

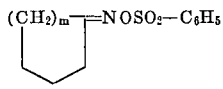

in which $m$ is 0 or 1. Subsequent reaction with anilines yields the aryl-substituted 2-imino-1-aza-cycloalkanes.

When Z is a reactive ether group, these derivatives are called lactim ethers. They are obtained by the reaction of lactams or thiolactams of the formula:

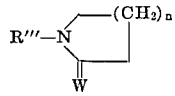

in which R''', W and $n$ have the same meaning as above, with alkylating agents, such as dialkyl-sulphates, alkyl halides, alkyl- and arylsulphonates or trialkyl-oxonium fluoroborates or by splitting off $CO_2$ from lactim esters of alkyl-carbonic acid.

The lactim ethers are then present either in the free form or in the form of salts:

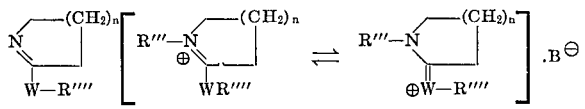

wherein R''', W and $n$ have the same meaning as above, R'''' is an optionally substituted alkyl, aralkyl or aryl group, and B is an anion such as halogen or sulphate. Examples of lactim ethers are the butyrolactim- and γ-valerolactim-O- and -S-methyl ethers.

The derivatives in which Z is a reactive imino group, can be obtained, for example, by acylation of 2-amino-1-aza-cycloalkanes

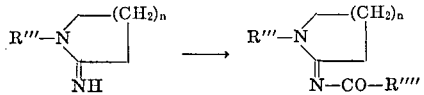

in which R''', R'''' and $n$ have the same meaning as above. In the case where R''' is hydrogen, the tautomers of the formula:

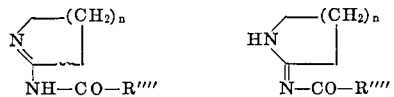

may also be present.

Special mention should be made of the reaction of anhydro-dilactams of the formula:

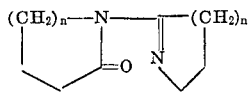

and of compounds of the formula:

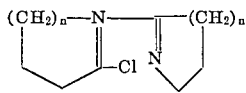

in the form of reactive imino esters which can easily be prepared from lactams and acid chlorides, with o-substituted anilines.

Finally, thiolactams of the formula:

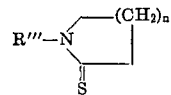

in which R''' has the same meaning as above, can also directly be reacted with o-substituted anilines in the presence of desulphurizing agents such as HgO, Ag$_2$O or Hg(CN)$_2$.

When R'' is hydrogen, the o-substituted 2-phenylimino-1-aza-cycloalkanes prepared according to the invention can be present in their tautomeric amino form as o-substituted 2-phenyl-amino-1-aza-cycloalkanes:

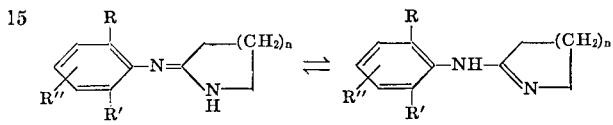

wherein R, R' and R'' and $n$ have the above meaning.

The 2-phenyl-imino-1-aza-cycloalkanes are bases which can be converted with pharmacologically unobjectionable (acceptable) inorganic or organic acids into crystallized salts most of which are readily soluble. Suitable acids are for example, hydrochloric acid, sulphuric acid, methanesulphonic acids, phosphoric acid, acetic acid, lactic acid, fumaric acid, succinic acid, tartaric acid, naphthalenedisulphonic acid or cyclohexyl-sulphamic acid.

The invention is illustrated by the following nonlimitative examples.

EXAMPLE 1

182 ml. of a solution of phosgene in benzene (containing 22 g. of phosgene in 100 ml. of benzene) is added dropwise at 20 to 25° C. to a solution of 34 g. of pyrrolidone in 180 ml. of benzene. Stirring is continued for 1 hour, 24.2 g. of 2,6-di-methylaniline in 60 ml. of benzene are then added dropwise at 20 to 25° C., and the mixture is stirred at room temperature for 2 hours and at 65° C. for 3 hours. After cooling, the benzene solution is decanted, the residue is taken up with water, rendered alkaline with a sodium hydroxide solution and the reaction product is extracted by shaking with a mixture of chloroform and ether. After evaporation of the solvent and distillation in a vacuum, 23.5 g. of 2-(2',6'-dimethylphenyl)-imino-1-aza-cyclopentane of B.P. 125 to 128° C./0.35 mm. Hg are obtained. The hydrochloride of this compound is obtained by taking up in ether with the addition of ethereal hydrochloric acid; M.P. 180 to 182° C.

EXAMPLE 2

31 grams of phosphorus oxychloride are added dropwise at 20 to 25° C. to a solution of 34 g. of pyrrolidone in 150 ml. of benzene, the mixture is further stirred for 2 hours, a solution of 32.2 g. of 2-amino-benzotrifluoride in 50 ml. of benzene is then added dropwise at 20 to 30° C. and the mixture is heated at 65° C. for 4 hours. After working up similarly to Example 1, the 2-(2'-trifluoromethyl-phenyl)-imino - 1 - aza-cyclopentane is obtained in an amount of 28.3 g; M.P. 142 to 143° C. (after recrystallization from alcohol); hydrochloride M.P. 270 to 272° C.

By analogous methods of operation there are abtained from pyrrolidone and:

2-ethyl - 6 - methylaniline, the 2-(2'-ethyl-6'-methylphenyl)-imino-1-aza-cyclopentane; B.P. 140 to 144° C./0.7 mm. Hg;

2,4,6-trimethylaniline, the 2-(2',4',6'-trimethyl)-imino-1-aza-cyclopentane, M.P. 79 to 81° C.;

2,5-dimethylaniline, the 2 - (2',5'-dimethylphenyl)imino-1-aza-cyclopentane, M.P. 86 to 88° C.; hydrochloride M.P. 181 to 182° C.;

2,6-dichloroaniline, the 2-(2',6'-dichlorophenyl)-imino-1-aza-cyclopentane, M.P. 118 to 120° C.;

hydrochloride M.P. 254 to 256° C.;
2-chloro-6-methylaniline, the 2-(2'-chloro-6'-methylphenyl)-imino-1-aza-cyclopentane, M.P. 95 to 97° C.;
2-methylaniline, the 2-(2'-methylphenyl)-imino-1-aza-cyclopentane, B.P. 120 to 124° C./0.4 mm. Hg; hydrochloride M.P. 161 to 162° C.;
2-methoxyaniline, the 2-(2'-methoxyphenyl)-imino-1-aza-cyclopentane, B.P. 130 to 138° C./0.3 mm. Hg; hydrochloride M.P. 210 to 212° C.;
2-chloroaniline, the 2-(2'-chlorophenyl)-imino-1-aza-cyclopentane, M.P. 122 to 123° C.;
2-methoxy-6-methylaniline, the 2-(2'-methoxy-6'-methylphenyl)-imino-1-aza-cyclopentane, M.P. 90 to 91° C.;
3-acetyl-2,6-dimethylaniline, the 2-(3'-acetyl-2',6'-dimethylphenyl)-imino-1-aza-cyclopentane, B.P. 170 to 172° C./0.3 mm. Hg;
2,6-dimethyl - 4 - methoxyaniline, the 2-(2',6'-dimethyl-4-methoxyphenyl)-imino-1-aza-cyclopentane, M.P. 82 to 84° C.;
2-ethoxy-5-methylaniline, the 2-(2'-ethoxy-5'-methylphenyl)-imino-1-aza-cyclopentane, B.P.$_{0.3}$ 140 to 145° C.;
4-chloro-2-methoxy-5-methylaniline, the 2-(4'-chloro-2'-methoxy - 5' - methylphenyl)-imino-1-aza-cyclopentane, B.P.$_{0.35}$ 168 to 170° C. M.P. 103 to 104° C., hydrochloride M.P. 186° C. (decomposition);
2,4-dimethoxyaniline, the 2 - (2',4' - dimethoxyphenyl)-imino-1-aza-cyclopentane, M.P. 127° C.;
2-chloro-5-trifluormethylaniline, the 2-(2'-chloro-5' - trifluormethylphenyl-imino - 1 -aza - cyclopentane, M.P. 123 to 124° C.;
4 - chloro-2-trifluormethylaniline, the 2-(4'-chloro-2'-trifluormethylphenyl)-imino - 1 - aza-cyclopentane, M.P. 124 to 125° C.;
2-chloro-4-methylaniline, the 2 - (2'-chloro-4'-methylphenyl)-imino-1-aza-cyclopentane, M.P. 131.5° C.;
2,5 - dimethoxyaniline, the 2-(2',5 - dimethoxyphenyl)-imino-1-aza-cyclopentane, M.P. 59 to 61° C.;
2,6 - dimethyl-3-propionylaniline, the 2-(2',6'-dimethyl-3' - propionylphenyl) - imino - 1 - aza-cyclopentane B.P.$_{0.1}$ 162 to 164° C., fumarate M.P. 165 bis 167° C. (decomposition);
2,6 - dimethyl-3-butyrylaniline, the 2-(2',6'-dimethyl-3'-butyrylphenyl) - imino-1-aza-cyclopentane, B.P.$_{0.2}$ 170 to 172° C.;
2,6-dimethyl-3-isobutyrylaniline, the 2-(2',6'-dimethyl-3'-isobutyrylphenyl)-imino - 1 - azacyclopentane, B.P.$_{0.2}$ 165 to 168° C.;
2,6-dimethyl-4-acetylaniline, the 2 - (2',6' - dimethyl - 4-acetylphenyl) - imino - 1 - aza-cyclopentane, B.P.$_{0.2}$ 170 to 174° C.;
2,6-dimethyl - 4 - propionylaniline, the 2-(2',6'-dimethyl-4 - propionylphenyl)-imino-1-aza-cylcopentane, B.P.$_{0.2}$ 180 to 185° C.;
2 - ethyl - 3 - acetyl-6-methylaniline, the 2-(2'-ethyl-3'-acetyl-6' - methylphenyl)-imino - 1 - aza-cyclopentane, B.P.$_{0.2}$ 173 to 175° C.;
2-ethyl-5-acetyl-6-methylaniline, the 2-(2'-ethyl-5'-acetyl-6' - methylphenyl) - imino -1 - aza-cyclopentane, B.P.$_{0.2}$ 175 to 178° C.;
2 - chloro - 3(or 5)-chloro-6-methylaniline, the 2-(2'-chloro - 3'-(or 5')-chloro-6'-methylphenyl) - imino-1-aza-cyclopentane, B.P.$_{0.2}$ 185 to 190° C.;
2 - methyl - 4 - acetylaniline, the 2-(2'-methyl-4'-acetylphenyl) - imino - 1 - aza - cyclopentane, B.P.$_{0.3}$ 160 to 164° C.;
2-methyl - 5 - acetylaniline, the 2-(2'-methyl-5'-acetylphenyl)-imino-1-aza-cyclopentane, B.P.$_{0.3}$ 160 to 162° C.

EXAMPLE 3

According to the method described in Example 2, the following compounds are obtained from 2-piperidone and the specified substituted anilines:

with 2,6 - dimethylaniline, the 2-(2',6'-dimethylphenyl)-imino-1-aza-cyclohexane, M.P. 74 to 75° C.; hydrochloride M.P. 190 to 192° C.;
with 2 - chloro - 6 - methylaniline, the 2-(2'-chloro-6'-methylphenyl) - imino - 1 - aza-cyclohexane; M.P. 95 to 96° C.; hydrochloride M.P. 165° C.;
with 2,6 - dichloroaniline, the 2-(2',6'-dichlorophenyl)-imino-1-aza-cyclohexane, M.P. 138 to 139° C.;
with 2 - methylaniline, the 2-(2'-methylphenyl) - imino-1-aza-cyclohexane, M.P. 55 to 56° C.;
with 2 - trifluoromethylaniline, the 2-(2'-trifluoromethylphenyl)-imino-1-aza-cyclohexane, M.P. 121 to 122° C.;
with 2,6 - dimethyl-3-acetylaniline, the 2-(2',6'-dimethyl-3' - acetylphenyl)-imino-1-aza-cyclohexane, B.P.$_{0.2}$ 178 to 182° C., fumarate M.P. 169 bis 170° C.

EXAMPLE 4

According to the method described in Example 2, there is obtained:

from N-methylpyrrolidone and 2,6-dimethylaniline, the 2-(2',6'-dimethylphenyl)-imino - 1 - (N-methyl)-aza-cyclopentane, 100 to 104° C./0.3 mm. Hg; fumarate M.P. 187 to 190° C.;
from N-methylpyrrolidone and 2,6-dichloroaniline, the 2-(2',6'-dichlorophenyl)-imino - 1 - (N-methyl)-aza-cyclopentane, M.P. 56 to 57° C.; hydrochloride M.P. 221 to 223° C.;
from N-methylpyrrolidone and 2-methylaniline, the 2-(2'-methylphenyl) - imino - 1 - (N-methyl)-aza-cyclopentane, 92 to 96° C./0.4 mm. Hg; fumarate M.P. 150 to 152° C.;
from N-methylpyrrolidone and 2,6 - dimethyl-3-acetylaniline, the 2-(2',6'-dimethyl-3'-acetylphenyl)-imino-1-(N-methyl)-aza-cyclopentane, B.P.$_{0.3}$ 158 to 160°.

EXAMPLE 5

44.4 grams of 1-vinyl-pyrrolidone-(2) dissolved in 150 ml. of benzene are mixed with 30.6 g. of phosphorus oxychloride at 20 to 25° C. The mixture is stirred for 3 hours, 24.2 g. of 2,6-dimethylaniline are then added dropwise at 20 to 25° C. and the mixture is heated under reflux for 10 hours. After working up similarly to Example 2, there is obtained the 2 - (2',6'-dimethylphenyl)-imino-1-aza-cyclopentane of B.P. 125 to 128° C./0.35 mm. Hg; hydrochloride M.P. 180 to 182° C.

EXAMPLE 6

30 grams of 2-chloro-1-[Δ$^1$-pyrrolinyl-(2)]-Δ$^2$-pyrrolidine are heated with 100 g. of 2-methylaniline at 110 to 120° C. for 5 hours and then at 150° C for a further 5 hours. After cooling, the mixture is rendered alkaline with a dilute sodium hydroxide solution, the base is extracted by shaking with a mixture of chloroform/ether and after distillation in a vacuum, the 2-(2'-methylphenyl)-imino-1-aza-cyclopentane, B.P. 120 to 125° C./0.4 mm. Hg is obtained in an amount of 38 g.; hydrochloride M.P. 161 to 162° C.

The same compound is obtained in an analogous way by heating N-[Δ$^1$-pyrrolinyl-(2)]-pyrrolidine-(2) (=anhydro-di-butyro-lactam) with 2-methylaniline.

EXAMPLE 7

30 grams of 2-chloro-1-aza-cyclohexane-(1) dissolved in 150 ml. of chloroform are added dropwise at 20° C. to a solution of 100 g. of 2-methylaniline in 200 ml. of chloroform, the mixture is stirred at 20° C. for 2 hours and heated under reflux for 12 hours. After working up in analogy with Example 2, there are obtained 25 g. of 2-(2'-methyl-phenyl)-imino-1-aza-cyclohexane of M.P. 55 to 56° C.

EXAMPLE 8

A solution of 44.3 g. of cyclopentanone-oxime-benzenesulphonate and 60 g. of 2-trifluoromethyl-aniline in 300 ml. of benzene is heated under reflux for 10 hours. Working up is performed by pouring the mixture into a dilute sodium hydroxide solution in analogy with Example 2. After distillation, there are obtained 25 g. of 2-(2'-trifluoromethyl-phenyl)-imino-1-azacyclohexane, M.P. 121 to 122° C.

EXAMPLE 9

A mixture of 24.3 g. of butyrolactim-S-methyl ether hydroiodide, 21.5 g. of 2-methylaniline, 100 ml. of ether and 5 ml. of water is heated at 80 to 90° C. for 15 hours. The reaction product is concentrated by evaporation in a vacuum, rendered alkaline with a sodium hydroxide solution and the precipitated base is taken up with ether. After distillation in a vacuum, there are obtained 12.2 g. of 2-(2′-methylphenyl)-imino-1-azacyclopentane, B.P. 120 to 125° C./0.4 mm. Hg; hydrochloride M.P. 161 to 162° C.

The same compound is obtained when the butyrolactim-S-methyl ether is replaced with butyrolactim-O-methyl ether.

EXAMPLE 10

A solution of 31 g. of Δ-thiovalerolactam and 33.3 g. of 2-methylaniline in 400 ml. of ethanol is vigorously stirred with the addition of 75 g. of mercury oxide at 0° C. for 8 hours and then at 80° C. for 15 hours. The mixture is filtered off with suction from the precipitate, the residue is distilled in a vacuum and there are obtained 15 g. of 2-(2′ - methylphenyl)-imino-1-azacyclohexane, M.P. 55 to 56° C.; B.P. 134 to 138° C./0.3 mm. Hg.

What is claimed is:

1. An o-substituted 2-phenyl-imino-1-azacycloalkane of the formula:

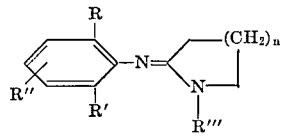

in which:

R is alkyl, alkoxy, chloro, trifluoromethyl, alkanoyl or mercaptoalkyl,

R′ is hydrogen, alkyl, alkoxy or chloro,

R″ is hydrogen, alkyl, alkoxy, chloro, trifluoromethyl, alkanoyl or alkoxycarbonyl, R‴ is hydrogen or alkyl, and n is 1 or 2, or a non-toxic salt thereof, the said alkyl, alkoxy and alkanoyl groups having 1 to 4 carbon atoms.

2. The compound of claim 1 which is 2-(2′,6′-dimethylphenyl)-imino-1-azacyclopentane.

3. The compound of claim 1 which is 2-(2′-trifluoromethyl-phenyl)-imino-1-azacyclopentane.

4. The compound of claim 1 is 2-(2′-ethyl-6′-methylphenyl)-imino-1-azacyclopentane.

5. The compound of claim 1 which is 2-(2′,4′,6′-trimethylphenyl)-imino-1-azacyclopentane.

6. The compound of claim 1 which is 2-(2′,5′-dimethylphenyl)-imino-1-azacyclopentane.

7. The compound of claim 1 which is 2-(2′,6′-dichlorophenyl)-imino-1-azacyclopentane.

8. The compound of claim 1 which is 2-(2′-chloro-6′-methylphenyl)-imino-1-azacyclopentane.

9. The compound of claim 1 which is 2-(2′-methylphenyl)-imino-1-azacyclopentane.

10. The compound of claim 1 which is 2-(2′-methoxyphenyl)-imino-1-azacyclopentane.

11. The compound of claim 1 which is 2-(2′-chlorophenyl)-imino-1-azacyclopentane.

12. The compound of claim 1 which is 2-(2′-methoxy-6′-methylphenyl)-imino-1-azacyclopentane.

13. The compound of claim 1 which is 2-(3′-acetyl-2′,6′-dimethylphenyl)-imino-1-azacyclopentane.

14. The compound of claim 1 which is 2-(2′,6′-dimethyl-4′-methoxyphenyl)-imino-1-azacyclopentane.

15. The compound of claim 1 which is 2-(2′,6′-dimethylphenyl)-imino-1-azacyclohexane.

16. The compound of claim 1 which is 2-(2′-chloro-6′-methylphenyl)-imino-1-azacyclohexane.

17. The compound of claim 1 which is 2-(2′,6′-dichlorophenyl)-imino-phenyl-1-azacyclohexane.

18. The compound of claim 1 which is 2-(2′-methylphenyl)-imino-1-azacyclohexane.

19. The compound of claim 1 which is 2-(2′-trifluoromethylphenyl)-imino-1-azacyclohexane.

20. The compound of claim 1 which is 2-(2′,6′-dimethylphenyl)-imino-1-(N-methyl)-azacyclopentane.

21. The compound of claim 1 which is 2-(2′,6′-dichlorophenyl)-imino-1-(N-methyl)-azacyclopentane.

22. The compound of claim 1 which is 2-(2′-methylphenyl)-imino-1-(N-methyl)-azacyclopentane.

23. The compound of claim 1 which is 2-(2′-ethoxy-5′-methylphenyl)-imino-1-azacyclopentane.

24. 2-(4′-chloro-2′-methoxy-5′-methylphenyl) - imino-1-azacyclopentane.

25. The compound of claim 1 which is 2-(2′,4′-dimethoxyphenyl)-imino-1-azacyclopentane.

26. The compound of claim 1 which is 2-(2′-chloro-5′-trifluormethylphenyl-imino-1-aza-cyclopentane.

27. The compound of claim 1 which is 2-(4′-chloro-2′-trifluormethylphenyl)-imino-1-aza-cyclopentane.

28. The compound of claim 1 which is 2-(2′-chloro-4′-methylphenyl)-imino-1-aza-cyclopentane.

29. The compound of claim 1 which is 2-(2′,5′-dimethoxyphenyl)-imino-1-aza-cyclopentane.

30. The compound of claim 1 which is 2-(2′,6′-dimethyl-3′-propionylphenyl)-imino-1-aza-cyclopentane.

31. The compound of claim 1 which is 2-(2′,6′-dimethyl-3′-butyrylphenyl)-imino-1-aza-cyclopentane.

32. The compound of claim 1 which is 2-(2′,6′-dimethyl-3′-isobutyrylphenyl)-imino-1-aza-cyclopentane.

33. The compound of claim 1 which is 2-(2′,6′-dimethyl-4′-acetylphenyl)-imino-1-aza-cyclopentane.

34. The compound of claim 1 which is 2-(2′,6′-dimethyl-4′-propionylphenyl-imino-1-aza-cyclopentane.

35. The compound of claim 1 which is 2-(2′-ethyl-3′-acetyl-6′-methylphenyl)-imino-1-aza-cyclopentane.

36. The compound of claim 1 which is 2-(2′-ethyl-5′-acetyl-6′-methylphenyl)-imino-1-aza-cyclopentane.

37. The compound of claim 1 which is 2-(2′-chloro-3′(or 5′) - chloro - 6′-methylphenyl)-imino-1-aza-cyclopentane.

38. The compound of claim 1 which is 2-(2′-methyl-4′-acetylphenyl)-imino-1-aza-cyclopentane.

39. The compound of claim 1 which is 2-(2′-methyl-5′-acetylphenyl)-imino-1-aza-cyclopentane.

40. The compound of claim 1 which is 2-(2′,6′-dimethyl-3′-acetylphenyl)-imino-1-aza-cyclohexane.

41. The compound of claim 1 which is 2-(2′,6′-dimethyl - 3′ - acetylphenyl) - imino-1-(N-methyl)-azacyclopentane.

References Cited

UNITED STATES PATENTS 3,284,465  11/1966  Scola _____ 260—326.85

FOREIGN PATENTS 1,367,799  6/1964  France _____ 260—293
579,303    7/1946  Great Britain _____ 260—293

OTHER REFERENCES

Bredereck et al.: Ber. 94, 2278–2295 (1961).

HENRY R. JILES, Primary Examiner

G. T. TODD, Assistant Examiner

U.S. Cl. X.R.

260—293.4, 294, 294.3, 294.7, 295, 296, 297, 294.8, 326.3, 326.5, 326.82, 326.83, 326.84, 326.85; 424—267, 274